United States Patent [19]

Sondergaard

[11] 3,735,630

[45] May 29, 1973

[54] MACHINE FOR BENDING
[75] Inventor: Harald Sondergaard, Bagsvaerd, Denmark
[73] Assignee: Sandvikens Jernverks Aktiebolag, Sandviken, Sweden
[22] Filed: May 4, 1971
[21] Appl. No.: 140,157

[52] U.S. Cl.....................................72/389, 72/453
[51] Int. Cl. ............................................B21d 5/01
[58] Field of Search...............................72/453, 389

[56] References Cited
UNITED STATES PATENTS

| | | | |
|---|---|---|---|
| 3,431,758 | 3/1969 | Nelson | 72/453 |
| 1,970,134 | 8/1934 | Ferris | 72/453 |
| 2,218,818 | 10/1940 | Harrington | 72/453 |
| 2,586,943 | 2/1952 | Haller | 72/453 |
| 3,387,473 | 6/1968 | Noordhoek | 72/389 |
| 3,472,057 | 10/1969 | Persico | 72/389 |

Primary Examiner—Charles W. Lanham
Assistant Examiner—Gene P. Crosby
Attorney—Pierce, Scheffler & Parker

[57] ABSTRACT

A machine for bending metal strip includes a power-driven reciprocating tool the movement of which is controlled by a governing means that is adapted to be moved to arbitrary positions continuously followed by the reciprocating tool.

3 Claims, 4 Drawing Figures

MACHINE FOR BENDING

The present invention relates to a machine for bending metal strips as cutting dies.

For such bending tasks there previously have been used pedal-governed machines of different types. Thus there was one type in which the pedal provided the bending force, there being no motor for delivering the necessary power. The force that had to be exerted on the pedal was thus dependent on how thick was the workpiece, which circumstance rendered the bending of thick pieces less accurate.

It has been attempted to improve upon this early device by using a motor to drive one of the bending tools in regular reciprocating cycles, thus exerting a hammering action on the workpiece. A pedal regulates the extent of the bending by moving the turning-point for the reciprocating movement. Also, this machine is less accurate.

In the machine according to the present invention the movable bending tool is moved in such a way that it accurately follows the movements of the pedal without oscillations. The force that has to be exerted on the pedal is constant and is independent of the force necessary for effecting the bending, this latter being delivered by This system gives a good accuracy of the bending operation.

The invention is described in the following specification with reference to the appended drawing, in which.

Figure 1:
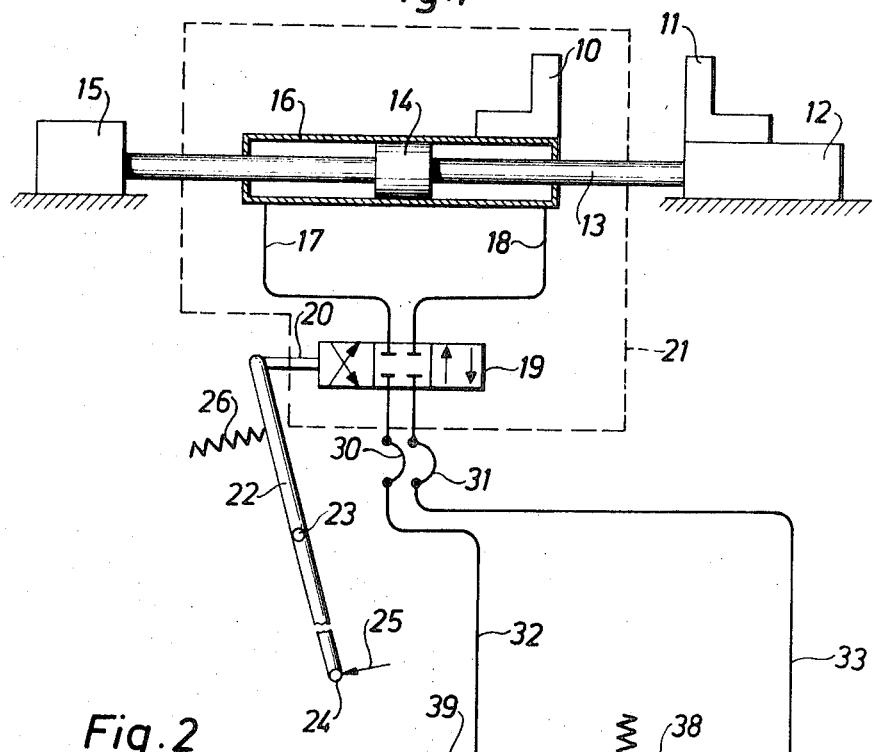
FIG. 1 is a circuit diagram of a machine according to the invention.
Figure 3:
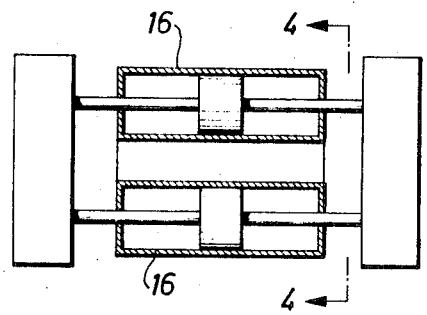
Figure 4:
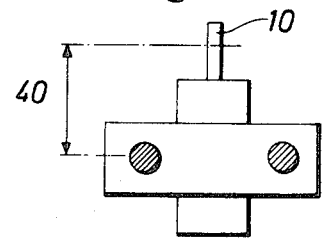

FIGS. 3 and 4 provide details of a pair of hydraulic cylinders in the machine shown in FIG. 1.

The machine in FIG. 1 comprises two bending tools, a movable tool 10 and a stationary tool 11. The stationary tool 11 is mounted on a tool holder 12, to which a piston rod 13 is connected. On the rod 13, there is mounted a piston 14. The other end of piston rod 13 is fixed in a support 15, both the piston 14 and the piston rod 13 being stationary. On the piston rod there is mounted a cylinder 16 which tightly surrounds the piston 14 and the rod 13. The cylinder 16 carries the movable tool 10, which is moved towards and away from the stationary tool 11 by reciprocating movement of cylinder 16.

Two hydraulic conduits, 17 and 18, are connected to the cylinder 16, one on each side of the piston 14. The ends of the conduits 17 and 18 remote from cylinder 16 are connected to a valve 19 of known type having a mechanism for governing the fluid pressure in the conduits, said mechanism being actuated by a slide 20 protruding from the valve. The valve is rigidly connected to the cylinder 16, the movable details that are drawn within the dashed line 21 forming one single movable assembly.

The valve slide 20 is actuated by a rod 22, which rod is swingably journalled on a bearing lug 23 and has a pedal 24 at its lower end. The pressure of an operator's foot is applied to pedal 24 in the direction of the arrow 25, and a spring 26 counterbalances the foot pressure. A spring that is not illustrated urges valve slide 20 into contact with the rod 22.

The described hydraulic system is connected to a pressure source by means of flexible conduits 30 and 31 in order to permit the assembly 21 to move. The pressure source comprises two conduits 32 and 33 connected to a tank 34 for fluid and a pump 35 with an electric motor 36, a level indicator 37, an adjustable pressure regulator 38 and a pressure gauge 39. The pressure regulator serves to set the pressure in the system at such a value that a suitable working pressure on the bending tools is obtained. Oil is suitably used as a pressure medium.

The system operates in the following way. When the cylinder 16 is in equilibrium in a certain position, the slide 20 is in a certain corresponding position. The pressure is in this position equal on both sides of the piston. When the pedal 24 is moved in either direction the slide 20 follows the movement, and the valve 19 redistributes the pressure in such a way that the cylinder 16 is forced to move to a new position, corresponding to the new position of the pedal. In every equilibrium position the slide 20 takes the same position in relation to the valve 19, and every change of the position of the pedal induces the system to strive to restore this position of the slide 20 in relation to the valve 19.

When the operator's foot is removed from pedal 25 the spring 26 pulls the pedal to a limit position in which a limit switch — not shown — breaks the current to the motor 36.

Figure 2:
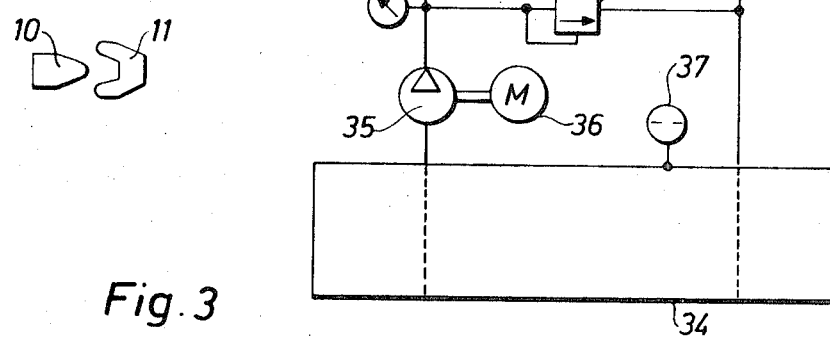
FIG. 2 illustrates bending tools for the machine shown in FIG. 1.

FIG. 2 shows (from above) two tools for bending cutting die knives. The U-shaped tool 11 is stationary and the wedge-shaped tool 10 is movable, as described in connection with FIG. 1.

FIG. 3 illustrates the piston system from above, a pair of cylinders 16, 16 being shown in section. The use of two cylinders instead of a single cylinder has the advantage that the lever arm 40 (FIG. 4) between the tool 10 and the cylinder axis becomes smaller thus reducing the bending moment exerted on the piston system.

Using suitable tools the described machine can be used not only for bending strips but also for bending other objects such, for example, as tubes. If can also be used for pressing articles together with a tight fit.

I claim:

1. Machine for bending and the like with a reciprocating tool which is driven from an hydraulic power system source, the movement being controlled by governing means, wherein the governing means comprises a valve body which is fixedly connected to the reciprocating tool and a movable slide in said valve body, said valve slide being connected to an operating means, said governing means being adapted to be continuously moved to an arbitrary position, and wherein the reciprocating tool is adapted to follow continuously the movement of the governing means and to be maintained stationary in a position corresponding to the position of the governing means.

2. Machine as defined in claim 1, in which the operating means is a pedal.

3. Machine as defined in claim 1, in which the reciprocating tool is actuated by a hydraulic twin cylinder.

* * * * *